(12) United States Patent
Olinsky

(10) Patent No.: US 10,764,314 B2
(45) Date of Patent: *Sep. 1, 2020

(54) IMPLICIT CROWDSOURCING FOR UNTRACKED CORRECTION OR VERIFICATION OF CATEGORIZATION INFORMATION

(71) Applicant: McAfee, LLC, Plano, TX (US)

(72) Inventor: Craig Philip Olinsky, Paderborn (DE)

(73) Assignee: McAfee, LLC, Santa Clara, CA (US)

( * ) Notice: Subject to any disclaimer, the term of this patent is extended or adjusted under 35 U.S.C. 154(b) by 84 days.

This patent is subject to a terminal disclaimer.

(21) Appl. No.: 16/111,060

(22) Filed: Aug. 23, 2018

(65) Prior Publication Data

US 2018/0367559 A1   Dec. 20, 2018

Related U.S. Application Data

(63) Continuation of application No. 14/929,270, filed on Oct. 31, 2015, now Pat. No. 10,091,224.

(51) Int. Cl.
*H04L 29/06* (2006.01)
*H04L 29/08* (2006.01)

(52) U.S. Cl.
CPC .......... *H04L 63/1425* (2013.01); *H04L 67/22* (2013.01)

(58) Field of Classification Search
CPC ............. H04L 63/1416; H04L 63/1408; H04L 63/1441; H04L 63/1458; G06F 21/552

USPC ........................................................... 726/22
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 7,506,155 B1 | 3/2009 | Stewart et al. | |
| 2010/0186088 A1* | 7/2010 | Banerjee ............. | H04L 63/1441 726/23 |
| 2011/0022559 A1 | 1/2011 | Andersen et al. | |
| 2011/0264585 A1 | 10/2011 | Abdulhayoglu | |
| 2013/0254329 A1* | 9/2013 | Lin ....................... | H04L 69/329 709/217 |
| 2014/0164385 A1 | 6/2014 | Liu et al. | |
| 2017/0126720 A1 | 5/2017 | Olinsky | |

FOREIGN PATENT DOCUMENTS

EP   1026608 A2   8/2000

* cited by examiner

*Primary Examiner* — Evans Desrosiers
(74) *Attorney, Agent, or Firm* — Patent Capital Group

(57) ABSTRACT

Embodiments of the present disclosure are directed to updating categorization of online content. An analytics engine implemented at least partially in hardware can receive an engagement indicator across a network interface; identify a type of the engagement indicator, the type of the engagement indicator comprising one of a positive engagement indicator or a negative engagement indicator; and update the reputation data stored in memory based on the type of the engagement indicator. A safe harbor time window is described during with user activity with online content is not reported to system administrators.

20 Claims, 5 Drawing Sheets

IMPLICIT CROWDSOURCING FOR UNTRACKED CORRECTION OR VERIFICATION OF CATEGORIZATION INFORMATION

CROSS-REFERENCE TO RELATED APPLICATION

This application is a continuation of (and claims the benefit of priority under 35 U.S.C. § 120) of pending U.S. patent application Ser. No. 14/929,270, filed Oct. 31, 2015, entitled "IMPLICIT CROWDSOURCING FOR UNTRACKED CORRECTION OR VERIFICATION OF CATEGORIZATION INFORMATION," Inventor Craig Philip Olinsky. The disclosure of the prior application is considered part of and is hereby incorporated by reference in their entirety in the disclosure of this application.

FIELD

This disclosure pertains to computing system, and in particular (but not exclusively) to implicit crowdsourcing for untracked correction or verification of categorization information.

BACKGROUND

User-informed categorization of online content (e.g., web sites or email) is based on a model of express user feedback. If a user determines that a security product has blocked an appropriate web site, or has categorized a benign email message as spam, the user can expressly provide feedback to the product (or product's web site) to indicate that the site is not malicious or that the email message is not spam. For example, if the user wants access to a blocked site, the user typically expressly asks that the site be unblocked. In such case, a user can provide express feedback regarding the ultimate categorization of this site (e.g., that the site is not spam, or is for shopping, viewing sports, etc.).

One drawback to this "express feedback" approach is that it requires the user to make affirmative actions to provide the express user feedback. Another drawback is that it requires the user to actually view potentially offensive or inappropriate site before determining whether the site is appropriate. Often, users are unwilling to view a site because viewing of inappropriate sites may be tracked by the security product and reported to the user's employer in the form of a log.

DETAILED DESCRIPTION

Figure 1:
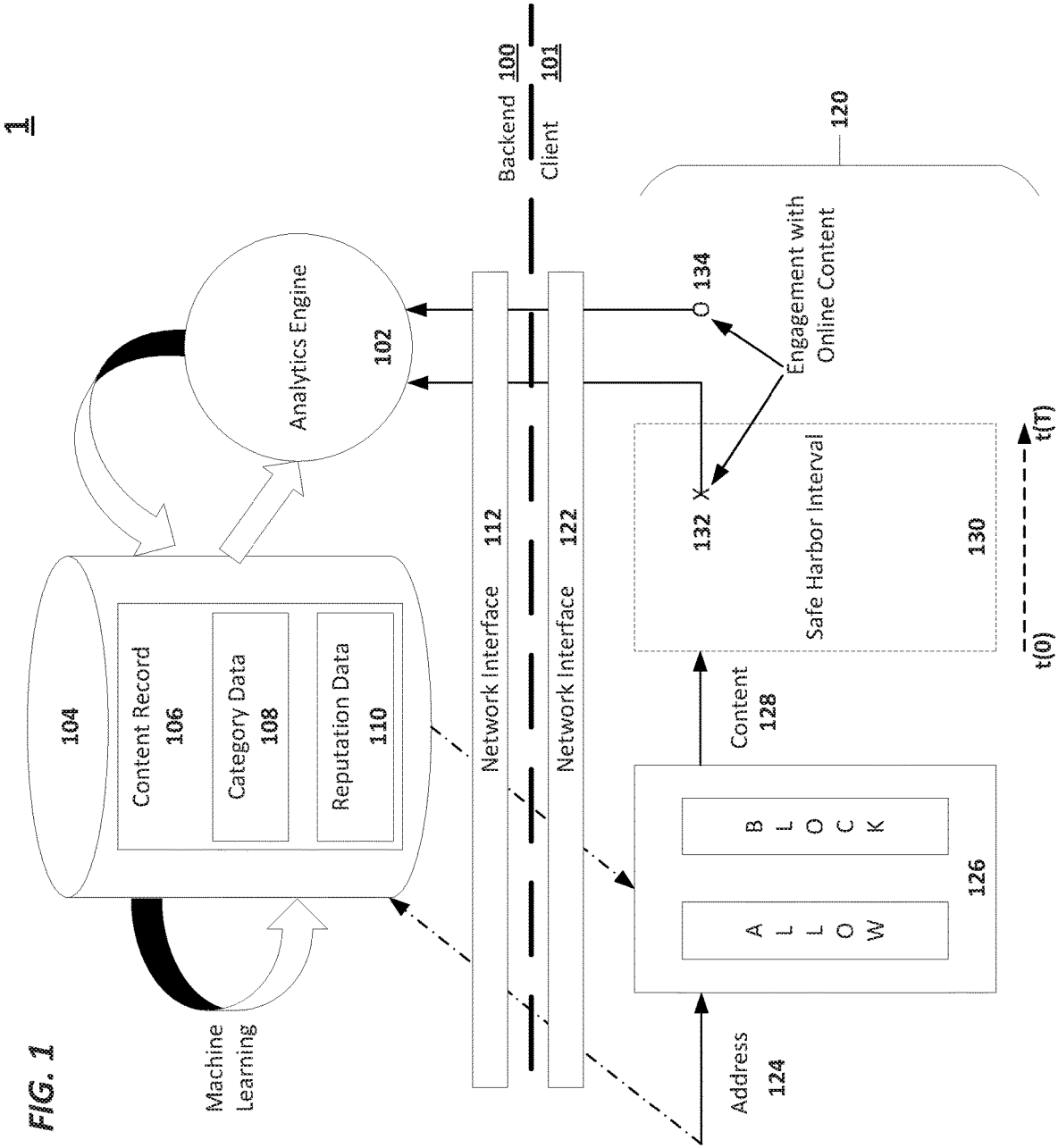
FIG. 1 is a schematic block diagram of a system for implicit crowdsourcing for verifying or correcting categorization information based on implicit user feedback in accordance with embodiments of the present disclosure.

The present disclosure describes receiving indications of user interactions (engagement) with online content (e.g., e-mail or websites) and extracting implicit categorization feedback based on those actions. Users do not have to explicitly provide feedback information; rather "normal" user activity can be used as implicit feedback. This feedback can be used to determine the categorization for an uncategorized site (e.g., safe, malicious, spam, high-bandwidth, inappropriate content, etc.), and can be used to inform the confidence value in the current categorization for categorized sites. To allow users to visit potentially unsafe, undesirable, or inappropriate content to get implicit feedback, the present disclosure also describes a "safe harbor" window, during which a user can explore unknown online content to determine the safety or appropriateness of the online content without reprisal from corporate IT administrators.

Implicit categorization information about a website or other online content (e.g., e-mail) is generated based on user activity, without requiring express user feedback. Features of the present disclosure include: categorization of online content by machine learning techniques based upon textual or contextual analysis of the content; categorization refinement based on user behavior (e.g., positive engagement vs negative engagement); receiving implicit feedback by an analytics module, which uses the engagement information as feedback to determine reputation of site with unknown reputation or to inform confidence value on sites already having a determination, storing information in a categorization database; and providing a time-based safe harbor policy.

If a security policy, based on current content categorizations, allows a user to go to an undesirable URL, the user can only tell if it is desirable or not after he or she sees it. The present disclosure uses a safe harbor policy will not track viewing of the site in the user's internet history if the user immediately (within a certain time—a safe harbor time window) closes the site or other implicitly indicates that the site is undesirable, inappropriate, or not useful. This implicitly negative feedback is passed to the analytics engine. From this info, an analytics engine can use implicit user activity to characterize online content as "bad" or "good" without informing corporate IT departments know that the user visited this site.

The this implicit feedback from safe harbor activity is taken into account by the analytics engine to update, verify, or revise the confidence level for the categorization and reputation for the online content, or may be used to create a negative categorization for an uncategorized site. On the other hand, if the user engages in positive activity after the expiration of the safe harbor period, such positive feedback will be passed to the analytics engine and reported to the security administrators (e.g., the information technology management service).

The analytics engine can use information from multiple users over time fine-tune the accuracy of the reputation and characterization of the online content. The more users and more time involved, the more accurate the results. For example, users who actively engage with online content having a negative reputation can be offset by users who elect to avoid engagement with online content having a negative reputation.

FIG. 1 is a schematic block diagram of a system 1 for implicit crowdsourcing for categorized online content. System 1 is includes a system backend 100 that can communicate across a network interface with the client 101. The system backend 100 includes an analytics engine 102. System backend 100 also includes a memory 104 for storing content records 106, category data 108 and reputation data 110. System backend 100 also includes a network interface 112 for communicating across a network, such as the Internet or cellular network, with client 101 and other networked devices or network elements. More details are provided in the text accompanying FIG. 2.

Client 101 may include a computer, laptop, tablet, smartphone, or other device that a user can use to access and browse online content. Client 101 includes a network interface across which the client 101 can communicate with networked elements, such as the system backend 100. Client 101 also includes a user interface 120, such as a browser and/or e-mail client that allows a user to browse the internet, receive e-mails, or otherwise communicate across a network via network interface 122.

A user operating client 101 may encounter online content that is unknown to the user, and may be undesirable, unsafe, or inappropriate for the user to view/visit. If the user decides to view or visit the online content, the user interface 120 can ping the system backend 100 with the address 124 of the online content so the system backend 100 can ascertain whether the online content is within the bounds of policies established for the client 101. For example, the system backend 100 can send an "Allow" or "Block" message 126 to the client 101 based on 1) whether the system backend 100 has reputation and/or category information about the online content and 2) policy information associated with the client 101. (The system backend 100 can use machine learning to create a new entry for addresses not already in the system, and begin tracking implicit user feedback for category and reputation characteristics for that address. Machine learning also works to update category and reputation information.)

The online content 128 is provided to the user interface 120 and a safe harbor time window 130 is started. Safe harbor time window 130 can be of a predetermined maximum amount of time (e.g., from t(0)-t(T), where T is a predetermined maximum amount of time).

The user can then engage with the online content, and the user activity can be tracked by the client 101 or by the system backend 100 through real time notification or logged events. User activity that constitutes engagement includes negative engagement (e.g., negative engagement 132) or positive engagement (e.g., positive engagement 134). Positive engagement may include user activity that implies that the online content is something that the user wants to see, is appropriate, is safe, or that the user is willing to risk viewing for whatever reason. Examples of positive engagement include, but are not limited to, clicking through various pages of a website, downloading content, bookmarking the website or adding to "favorites," saving an e-mail, spending a certain amount of time on the site (e.g., a time longer than the safe harbor time window 130), clicking on links provided by the website or e-mail, referring to or linking the content in an email, social network posting, filling out a form on the site, etc.

Negative engagement may include user activity that implies that the online content is something that the user does not want to see, is inappropriate, is unsafe, or is otherwise in violation of a corporate policy or otherwise too risky for viewing. Examples of negative engagement include, but are not limited to, closing a window displaying the website (including closing the browser) removing an address from a browsing history, backing out of a website, deleting an e-mail, moving an e-mail to a spam or junk folder, hiding a newsfeed item, accepting an invitation to redirect away from or exit the website, unsubscribing to an e-mail, clicking on a "do not show me this again" control, etc.

Certain user activity can be weighted differently for the purposes of affecting characterization or reputation. For example, immediately closing a website window may be weighted more heavily negative than if the user were to browse the website for a few minutes, click on some links, and then back out of the website.

The safe harbor time window 130 can also be used as a period of time during which user activity can be characterized as either positive engagement or negative engagement. For example, if a user closes a website during the safe harbor time window 130, the user activity (closing the website) can be characterized as negative engagement (e.g., negative engagement 132). But closing a website after the expiration of the safe harbor time window 130 may not necessarily be negative engagement, and the system backend 100 may not treat the user activity as negative engagement or may weight the user activity differently.

Positive engagement during the safe harbor time window 130 may represent a user exploring the online content, but may be followed by a negative engagement. So positive engagement during the safe harbor time window 130 may be ignored or weighted differently than positive treatment after the expiration of the safe harbor time window 130. Positive engagement after the expiration of the safe harbor time window 130 can be considered affirmative positive engagement for feedback and reporting purposes (e.g., positive engagement 134).

Negative engagement 132 within the safe harbor time window 130 can be used for feedback. Likewise, positive engagement 134 outside the safe harbor time window 130 can be used for feedback and reporting.

If the user activity is a negative engagement 132 during the safe harbor period, and forgoes taking any other action, the client 101 (or the system backend 100) can consider the user to be an "innocent viewer," in which case, the negative engagement 132 during the safe harbor time window 132 is determined to be negative feedback for the site and the user's viewing of the site is not reported, e.g., to an IT department for tracking user Internet browsing history. That the activity is not reported if it occurs during the safe harbor can allow "innocent viewers" to make informed decisions about the characteristics of the online content while protecting innocent viewers from potential consequences of having viewed the site. The feedback is transmitted to the system backend 100 for processing.

If the user activity is a positive engagement after the safe harbor time window (e.g., positive engagement 132), the positive feedback is transmitted to the system backend 100 for processing.

The implicit negative feedback can be transmitted to an analytics module 102, which uses the implicit negative feedback information, along with similar information from other users, to inform the confidence level in the current categorization for the site.

Figure 2:
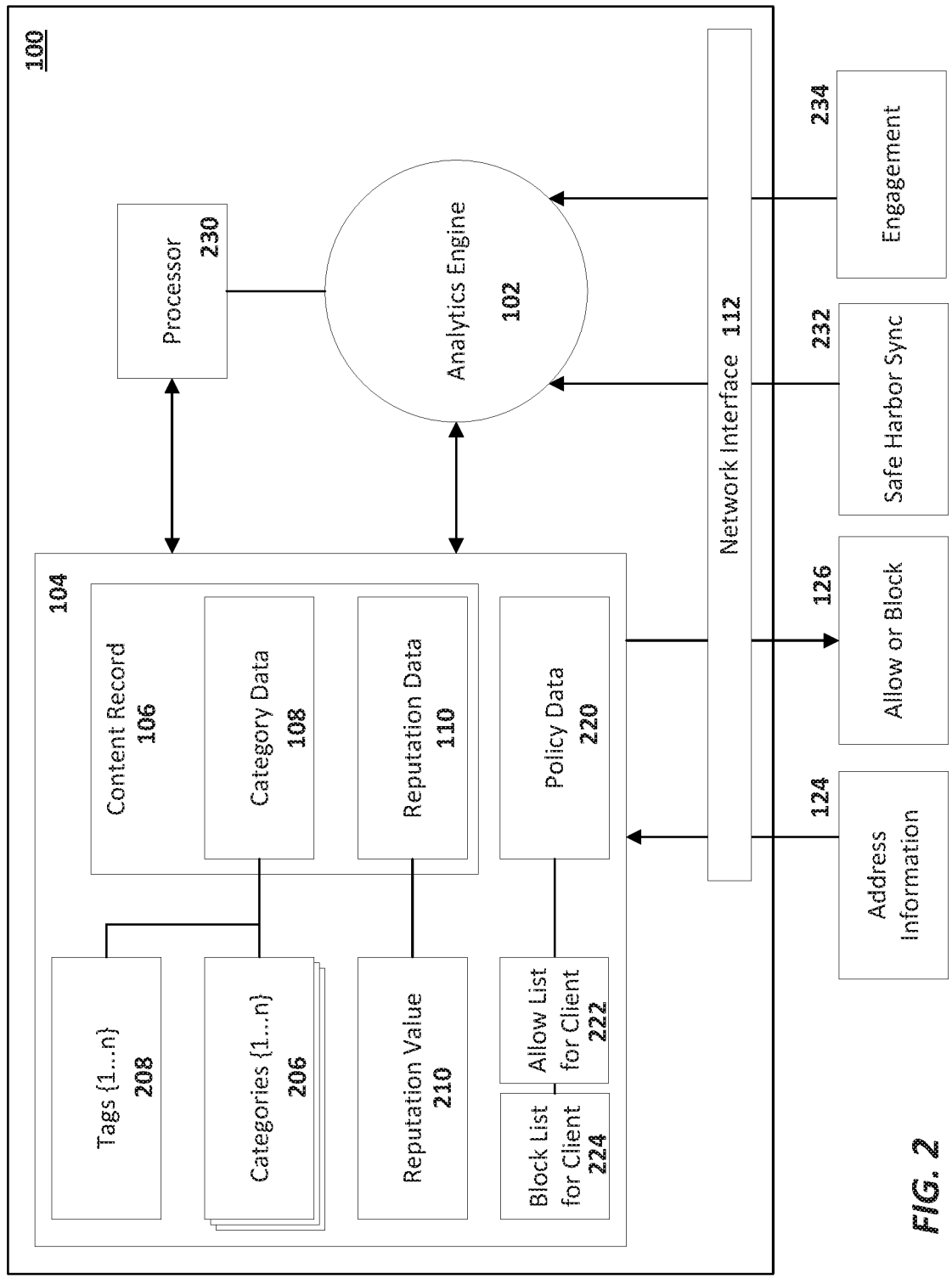
FIG. 2 is a schematic block diagram of a system backend for updating categorization information based on implicit user feedback in accordance with embodiments of the present disclosure.

Turning to FIG. 2, FIG. 2 is a schematic block diagram of a system backend 100. System backend 100 includes an analytics engine 102, a memory 104 for storing category data 108, reputation data 110, and policy data 220. System backend 100 also includes a processor 230, which can be a hardware processor or a software processor or both. System backend 100 also includes a network interface 112 for communications across a network, such as the Internet or a cellular network.

The system backend 100 can receive (across network interface 112) from a client 101 (in FIG. 1) an indication of an address 124 for online content the user wants to view or visit or otherwise interact with. If the address 124 is associated with known online content that is stored in memory 104, the system backend 100 can cross reference category data 108 and reputation data 110 for the online content against policy data 220 for the client 101. The online content may also be identified in an "allowed list" 222 or a "blocked list" 224 stored for the client 101.

If the address 124 is associated with online content that is unknown to the system backend 100, the system backend 100 can create a new record for the online content and store the new record as a content record 106 in memory 104, as well as aspects of the user feedback (for example, positive or negative weightings) which may either directly trigger a response or serve as partial information in a later classification decision about the content.

Depending on the online content, the system backend 100 can transmit a message 126 to the client 101 signaling either an "allow" or a "block." If no information previously existed for the online content, the default can be set to "allow," which can be updated based on forthcoming user feedback. Alternatively, the default can be set to "block," in which case user access to the content can be used for feedback purposes.

The system backend 100 can receive an indication of engagement 234 associated with user activity with the online content. The user activity can be a negative engagement or a positive engagement.

The analytics engine 102 can use the type of engagement to update the content record 106 stored in memory 104. Content record 106 can include category data 108 and reputation data 110. The category data 108 can include one or more categories 206, such as violent content, pornographic content, advertising content, movie and entertainment content, etc. The category data 108 can also include one or more tags 208. The tags 208 can be a discrete set of labels with which the analytics engine 102 can use to determine (or correct) membership in one or more categories 206. Based on the engagement feedback 234, the analytics engine 102 can determine whether one or more tags 208 associated with the content record 106 is an accurate description of the website.

The analytics engine 102 can also use this feedback to determine a utility rating for the site. For example, from positive feedback, the website may be categorized as being useful and assume that the site is relevant to the user (e.g., and not just a page full of ads). User engagement can be used to determine whether a site includes desired information or unwanted information: desired information would lead to positive engagement, whereas unwanted information would lead to negative engagement. This disclosure pertains not just to determining safe/harmful online content, but also whether online content is something the user would find useful or relevant. The disclosure contemplates that the implicit actions of a plurality of users with the online content can, in some embodiments lead to a recommendation of content, not just based on what it is, but if it is a good example of content that the user is interested in (e.g., a full new story will take longer to read and more engagement than just a summary of the story).

In addition to content categorization, the analytics engine 102 can also use the engagement 234 as feedback to update or verify content reputation by updating or verifying reputation data 110 for the content. Reputation data 110 can include a numeric reputation value that can be mapped to a reputation scale, such as a good—bad scale or a safe—malicious scale, etc.

Positive engagement can imply that a user looked at the site for a long time, bookmarked it, browsed through to another page on the site, shared or sent a link to the site, conducted a transaction, etc. Positive engagement, thus, can be used by the analytics engine 102 as evidence in favor of a site categorization that should be allowed by the user's policy (e.g., policy data 220 stored in memory 104).

Negative engagement can imply that the user closed the site right away, marked content as spam, junk, etc. Negative engagement is evidence the analytics engine 102 uses to verify that the content is properly categorized as "block" or "not useful."

The type of engagement can be indicated by communicating to the analytics engine 102 the actual actions taken by the user as the user engages with the online content. For example, if the user decides to follow a hyperlink in the online content, the request for access to the hyperlink content can be indicated to the analytics engine 102. The analytics engine 102 interprets that engagement across multiple users and instances to decide how to interpret and weight the engagement. Following a link to deeper substantive content can be interpreted by the analytics engine as a positive engagement; while following a link to unsubscribe or exit can be interpreted as a negative engagement. As more and more users engage with online content, the analytics engine 102 can use machine learning to more accurately assess the type of engagement as well as the characteristics of the online content.

In some embodiments, the client 101 can synchronize the safe harbor with the system backend 100 by sending a safe harbor sync signal 232 to the analytics engine 102. By synchronizing the safe harbor between the client 101 and the system backend 100, when the analytics engine receives indications of user activity, the analytics engine 102 can determine how to characterize the user activity as either a positive engagement or a negative engagement (and, in some cases, can determine how to weight the user activity).

Figure 3:
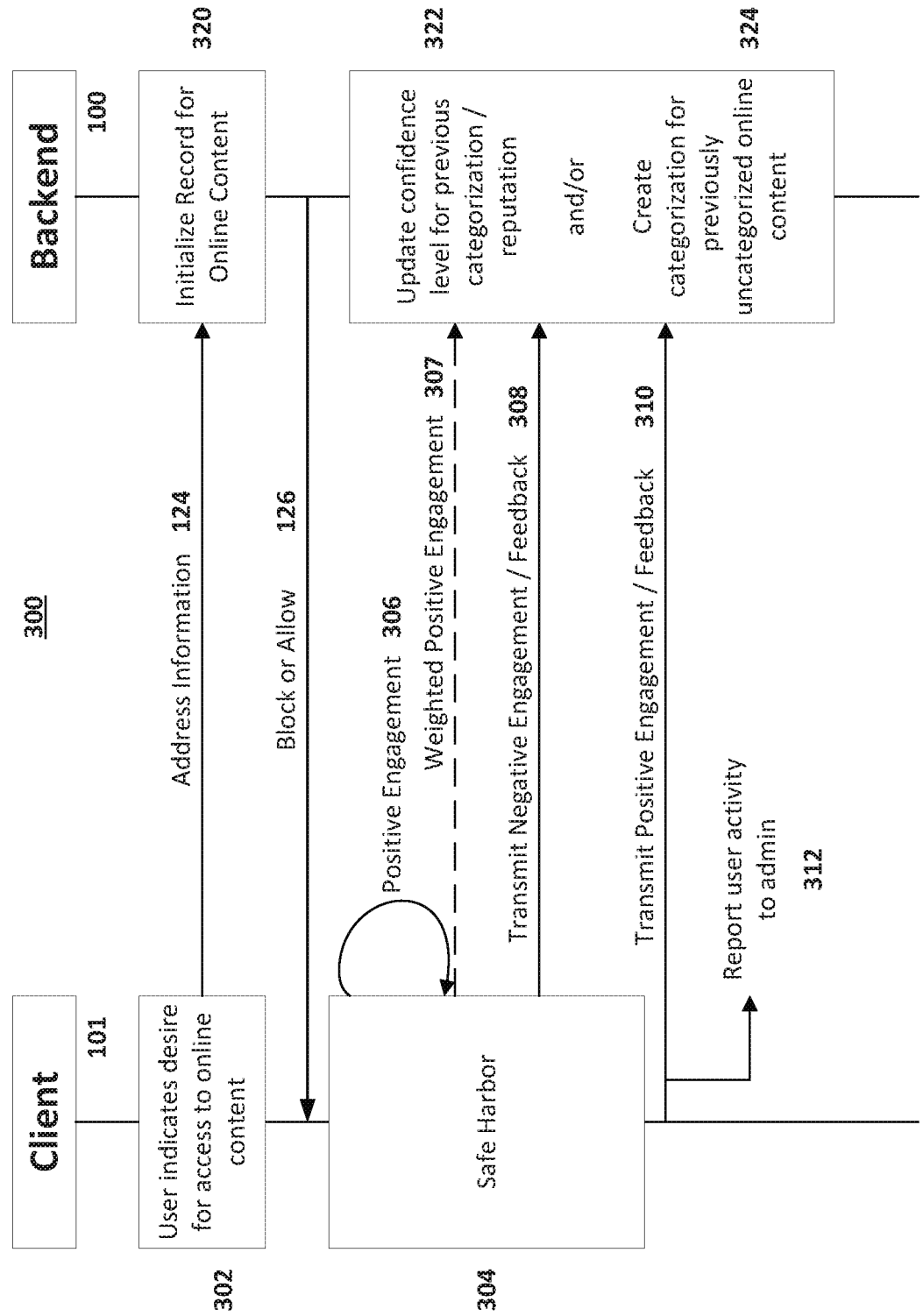
FIG. 3 is a process flow diagram for using implicit feedback to verify or correct categorized information based on implicit user feedback in accordance with embodiments of the present disclosure.

FIG. 3 is a process flow diagram 300 flow diagram for using implicit feedback to verify or correct categorized information based on implicit user feedback in accordance with embodiments of the present disclosure. Process flow diagram 300 is illustrated as a swim-lane diagram showing steps performed by client 101 and system backend 100. A user on client 101 can indicate a desire for access to online content (302). The client 101 can send address information 124 to the system backend 100. The system backend 100 can initialize a client record for the online content (320). Initializing the online content can include determining whether a record 106 exists at the system backend 100 for the online content. If a record 106 exists, the system backend 100 cans end a block or allow message 126 to the client 101. If a record does not exist for the online content, the system backend 100 can create a new record for the online content using the address information 124 and machine learning for an initial categorization.

The client 101 can initialize a safe harbor time window 132 (304). While the safe harbor time window is open, negative user activity can be transmitted to the system backend for processing. An analytics engine 102 at system backend 100 can process negative engagement user activity to update or verify the online content record category data and reputation data (322). The system backend 100 can also establish a content characterization and reputation for new content records (324). But during the safe harbor time window, any user activity, whether considered positive engagement or negative engagement, is not reported to system administrators, such as information technology management services or corporate IT departments.

For positive engagement that occurs during the safe harbor window, the client 101 can forgo reporting the activity as feedback to the system backend 100 because positive engagement during the safe harbor can imply that the user is exploring the content to learn whether the content is safe, desirable, or appropriate (306). In some embodiments, positive engagement during the safe harbor time window 132 can optionally be sent to the system backend 100 (307). If negative feedback is sent during the safe harbor 132 after some positive feedback is sent, the analytics engine 102 can consider the positive feedback transmitted during the safe harbor with less weight. For example, if the user has to explore the content, then the content may not be "as bad" as content that causes the user to take immediate negative engagement.

Positive engagement after the safe harbor 132 expires can be sent to the system backend 100 (310). The analytics engine 102 can use the positive engagement as positive feedback to update reputation and categorization, or otherwise update the confidence level of existing records. The analytics engine 102 can also create a new categorization and reputation for a new record using the positive feedback. User activity after the expiration of the safe harbor 132 is reported to the system administrator (312).

In general, "servers," "devices," "computing devices," "host devices," "user devices," "clients," "servers," "computers," "systems," etc., can include electronic computing devices operable to receive, transmit, process, store, or manage data and information associated with the computing environment. As used in this document, the term "computer," "computing device," "processor," or "processing device" is intended to encompass any suitable processing device adapted to perform computing tasks consistent with the execution of computer-readable instructions. Further, any, all, or some of the computing devices may be adapted to execute any operating system, including Linux, UNIX, Windows Server, etc., as well as virtual machines adapted to virtualize execution of a particular operating system, including customized and proprietary operating systems.

Host and user devices, including some implementations of gateway devices, can further include computing devices implemented as one or more local and/or remote client or end user devices, such as personal computers, laptops, smartphones, tablet computers, personal digital assistants, media clients, web-enabled televisions, telepresence systems, gaming systems, multimedia servers, set top boxes, smart appliances, in-vehicle computing systems, and other devices adapted to receive, view, compose, send, or otherwise interact with, access, manipulate, consume, or otherwise use applications, programs, and services served or provided through servers within or outside the respective device. A host device can include any computing device operable to connect or communicate at least with servers, other host devices, networks, and/or other devices using a wireline or wireless connection. A host device, in some instances, can further include at least one graphical display device and user interfaces, including touchscreen displays, allowing a user to view and interact with graphical user interfaces of applications, tools, services, and other software. It will be understood that there may be any number of host devices, as well as any number of host devices. Further, the term "host device," "client," "end user device," "endpoint device," and "user" may be used interchangeably as appropriate without departing from the scope of this disclosure. Moreover, while each end user device may be described in terms of being used by one user, this disclosure contemplates that many users may use one computer or that one user may use multiple computers, among other examples.

It should be appreciated that the examples presented above are non-limiting examples provided merely for purposes of illustrating certain principles and features and not necessarily limiting or constraining the potential embodiments of the concepts described herein. For instance, a variety of different embodiments can be realized utilizing various combinations of the features and components described herein, including combinations realized through the various implementations of components described herein. Other implementations, features, and details should be appreciated from the contents of this specification.

Aspects of the embodiments are directed to a computer program product tangibly embodied on a non-transitory computer readable medium, the computer program product comprising executable instructions to detect user access to online content, the user access administered by an information technology management service; start a timer upon detecting the user access to the online content, the timer set to expire after a predetermined threshold maximum amount of time; detect user activity associated with the online content; and identify the user activity as a negative engagement with the online content. If the negative engagement with the online content occurs within the threshold maximum amount of time, the computer program product may be operable to transmit a negative engagement identifier to an analytics engine for updating a categorization of the online content in accordance with the negative engagement; and forgo reporting the user activity to information technology management service.

In some implementations of the embodiments, the threshold maximum amount of time comprises a safe harbor period during which user activity is not logged for reporting to the information technology management service.

In some implementations of the embodiments, the negative engagement occurs within the safe harbor and after user activity that is identified as positive engagement.

In some implementations of the embodiments, the user activity with the online content occurs after the safe harbor period is identified as a positive engagement with the online content and the user access to the online content is logged.

In some implementations of the embodiments, the negative engagement identifier is used to verify a reputation of the online content.

In some implementations of the embodiments, if the user activity associated with the online content occurs after the threshold maximum amount of time, the computer program product is further operable when executed to report the user activity to the information technology management service.

In some implementations of the embodiments, if the user activity occurs after the threshold maximum amount of time and is a positive engagement with the online content, the computer program product is operable when executed to transmit a positive engagement identifier to the analytics engine.

In some implementations of the embodiments, the negative engagement comprises one or more of closing a browsing window, backing out of a website, moving an e-mail to a spam folder, or deleting an e-mail.

In some implementations of the embodiments, the online content is known to the information technology management service.

In some implementations of the embodiments, the computer program product is further operable to transmit an indication of the online content to the analytics engine, the indication of the online content comprising one of an Internet address or an e-mail address associated with the online content.

Aspects of the embodiments are directed to computer implemented method performed at an analytics engine implemented at least partially in hardware. The method includes detecting user access to online content, the user access administered by an information technology management service; starting a timer upon detecting the user access to the online content, the timer set to expire after a predetermined threshold maximum amount of time; detecting user activity associated with the online content; and identifying the user activity as a negative engagement with the online content. If the negative engagement with the online content occurs within the threshold maximum amount of time, the method includes transmitting a negative engagement identifier to an analytics engine for updating a categorization of the online content in accordance with the negative engagement; and forgoing reporting the user activity to information technology management service.

In some implementations of the embodiments, the threshold maximum amount of time comprises a safe harbor period during which user activity is not logged for reporting to the information technology management service.

In some implementations of the embodiments, the negative engagement occurs within the safe harbor and after user activity that is identified as positive engagement.

In some implementations of the embodiments, the user activity with the online content occurs after the safe harbor period is identified as a positive engagement with the online content and the user access to the online content is logged.

In some implementations of the embodiments, the negative engagement identifier is used to verify a reputation of the online content.

In some implementations of the embodiments, if the user activity associated with the online content occurs after the threshold maximum amount of time, the method further comprises reporting the user activity to the information technology management service.

In some implementations of the embodiments, if the user activity occurs after the threshold maximum amount of time and is a positive engagement with the online content, the method further comprises transmitting a positive engagement identifier to the analytics engine.

In some implementations of the embodiments, the negative engagement comprises one or more of closing a browsing window, backing out of a website, moving an e-mail to a spam folder, or deleting an e-mail.

In some implementations of the embodiments, the online content is known to the information technology management service.

In some implementations of the embodiments, the method also includes transmitting an indication of the online content to the analytics engine, the indication of the online content comprising one of an Internet address or an e-mail address associated with the online content.

Aspects of the embodiments include a computing apparatus configured to operate as an analytics engine implemented at least partially in hardware. The apparatus includes a network interface to receive an engagement indicator of online content from one or more network devices; one or more hardware processors to process the engagement indicator, the analytics engine operable to identify a type of the engagement indicator, the type of the engagement indicator comprising one a positive engagement indicator or a negative engagement indicator; and update a content characteristic of the online content, the content characteristic stored in a repository.

In some implementations of the embodiments, the content characteristic comprises a reputation of the online content, and the analytics engine uses the engagement indicator to update the reputation of the online content.

In some implementations of the embodiments, the engagement indicator comprises one of a positive engagement or a negative engagement, and wherein the analytics engine uses one of the positive engagement or the negative engagement to update the reputation of the online content.

In some implementations of the embodiments, the analytics engine uses the positive indicator to verify a positive reputation of the online content.

In some implementations of the embodiments, the engagement indicator represents implicit user activity, the implicit user activity comprising a mouse click on a link within the online content, a mouse click backing out of the online content, a transfer of the online content to a spam folder, or a bookmarking of the online content.

In some implementations of the embodiments, the engagement indicator indicates whether user activity associated with the online content was performed within a predetermined threshold amount of time.

In some implementations of the embodiments, reputation of the online content comprises a number value, the numeric value mapped to a scale that indicates a measure of the reputation of the online content.

In some implementations of the embodiments, the scale measures a safety and maliciousness of the online content.

In some implementations of the embodiments, the analytics engine uses the engagement identifier to associate the online content with one or more tags, each of the one or more tags identifying characteristics of the online content.

Aspects of the embodiments include a system for updating categorization of online content. The system may include one or more processors implemented at least partially in hardware, a memory for storing category data and reputation data, and an analytics engine implemented at least partially in hardware. The analytics engine can be configured to receive an engagement indicator across a network interface, identify a type of the engagement indicator, the type of the engagement indicator comprising one of a positive engagement indicator or a negative engagement indicator, and update the reputation data stored in memory based on the type of the engagement indicator.

In some implementations of the embodiments, the reputation data comprises a reputation of the online content, and the analytics engine uses the engagement indicator to update the reputation of the online content.

In some implementations of the embodiments, the engagement indicator comprises one of a positive engagement or a negative engagement, and wherein the analytics engine uses one of the positive engagement or the negative engagement to update the reputation of the online content.

In some implementations of the embodiments, the analytics engine uses the positive indicator to verify a positive reputation of the online content.

In some implementations of the embodiments, the engagement indicator represents implicit user activity, the implicit user activity comprising a mouse click on a link within the online content, a mouse click backing out of the online content, a transfer of the online content to a spam folder, or a bookmarking of the online content.

In some implementations of the embodiments, the engagement indicator indicates whether user activity associated with the online content was performed within a predetermined threshold amount of time.

In some implementations of the embodiments, reputation of the online content comprises a number value, the numeric value mapped to a scale that indicates a measure of the reputation of the online content.

In some implementations of the embodiments, the scale measures a safety and maliciousness of the online content.

In some implementations of the embodiments, the analytics engine uses the engagement indicator to associate the online content with one or more tags, each of the one or more tags identifying characteristics of the online content.

Aspects of the embodiments are directed to a computer program product tangibly embodied on non-transient computer readable storage media. The computer program product including instructions that are operable when executed to identify a type of the engagement indicator, the type of the engagement indicator comprising one a positive engagement indicator or a negative engagement indicator; and update a content characteristic of the online content, the content characteristic stored in a repository.

In some implementations of the embodiments, the content characteristic comprises a reputation of the online content, and the computer program product includes instructions operable when executed to use the engagement indicator to update the reputation of the online content.

In some implementations of the embodiments, the engagement indicator comprises one of a positive engagement or a negative engagement, and wherein the computer program product includes instructions operable when executed to use one of the positive engagement or the negative engagement to update the reputation of the online content.

In some implementations of the embodiments, the computer program product includes instructions operable when executed to use the positive indicator to verify a positive reputation of the online content.

In some implementations of the embodiments, the engagement indicator represents implicit user activity, the implicit user activity including a mouse click on a link within the online content, a mouse click backing out of the online content, a transfer of the online content to a spam folder, or a bookmarking of the online content.

In some implementations of the embodiments, the engagement indicator indicates whether user activity associated with the online content was performed within a predetermined threshold amount of time.

In some implementations of the embodiments, reputation of the online content comprises a number value, the numeric value mapped to a scale that indicates a measure of the reputation of the online content.

In some implementations of the embodiments, the scale measures a safety and maliciousness of the online content.

In some implementations of the embodiments, the computer program product includes instructions operable when executed to use the engagement identifier to associate the online content with one or more tags, each of the one or more tags identifying characteristics of the online content.

Aspects of the embodiments are directed to an analytics engine, implemented at least partially in hardware. The analytics engine includes a means for identifying a type of the engagement indicator, the type of the engagement indicator comprising one a positive engagement indicator or a negative engagement indicator; and a means for updating a content characteristic of the online content, the content characteristic stored in a repository.

In some implementations of the embodiments, the content characteristic comprises a reputation of the online content, and the analytics engine includes a means for using the engagement indicator to update the reputation of the online content.

In some implementations of the embodiments, the engagement indicator comprises one of a positive engagement or a negative engagement, and wherein the analytics engine includes a means for using one of the positive engagement or the negative engagement to update the reputation of the online content.

In some implementations of the embodiments, the analytics engine includes a means for using the positive indicator to verify a positive reputation of the online content.

In some implementations of the embodiments, the engagement indicator represents implicit user activity, the implicit user activity including a mouse click on a link within the online content, a mouse click backing out of the online content, a transfer of the online content to a spam folder, or a bookmarking of the online content.

In some implementations of the embodiments, the engagement indicator indicates whether user activity associated with the online content was performed within a predetermined threshold amount of time.

In some implementations of the embodiments, reputation of the online content comprises a number value, the numeric value mapped to a scale that indicates a measure of the reputation of the online content.

In some implementations of the embodiments, the scale measures a safety and maliciousness of the online content.

In some implementations of the embodiments, the analytics engine includes a means for using the engagement identifier to associate the online content with one or more tags, each of the one or more tags identifying characteristics of the online content.

Figure 5:
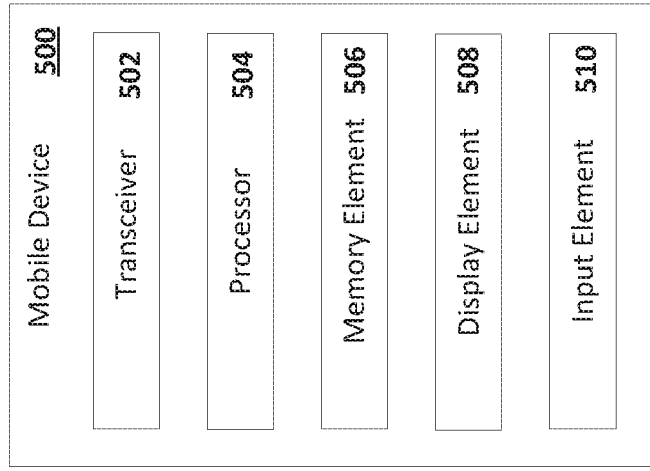
FIG. 5 is a schematic block diagram of a mobile device in accordance with embodiments of the present disclosure.
Figure 4:
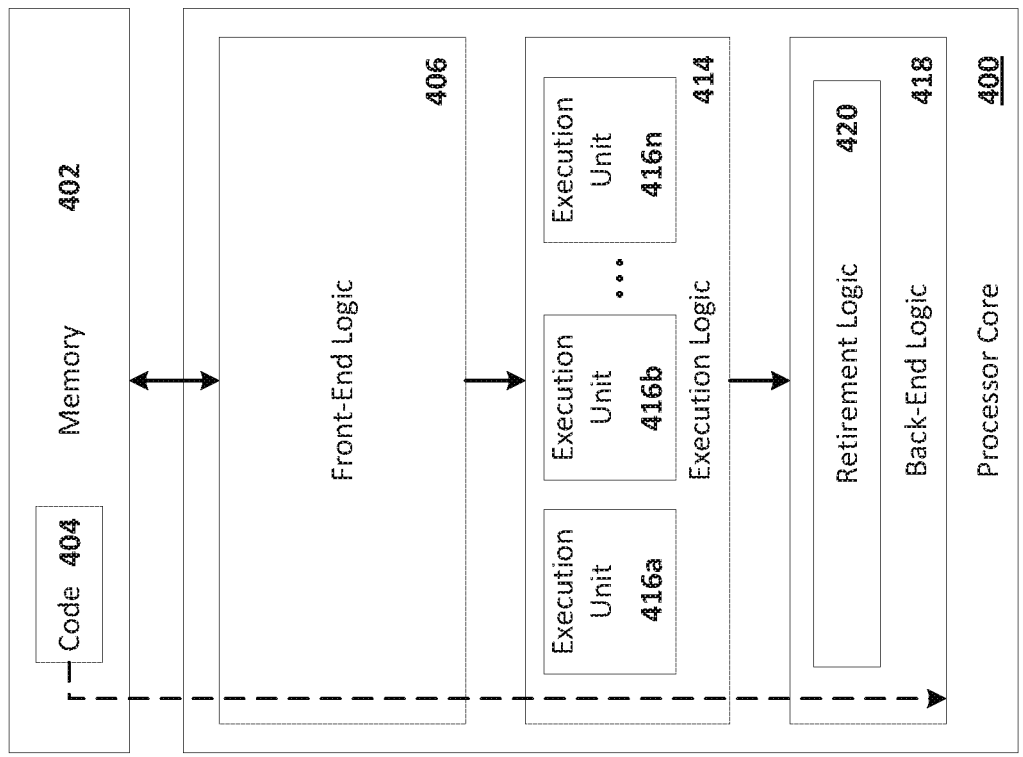
FIG. 4 is an example illustration of a processor according to an embodiment of the present disclosure.
Figure 6:
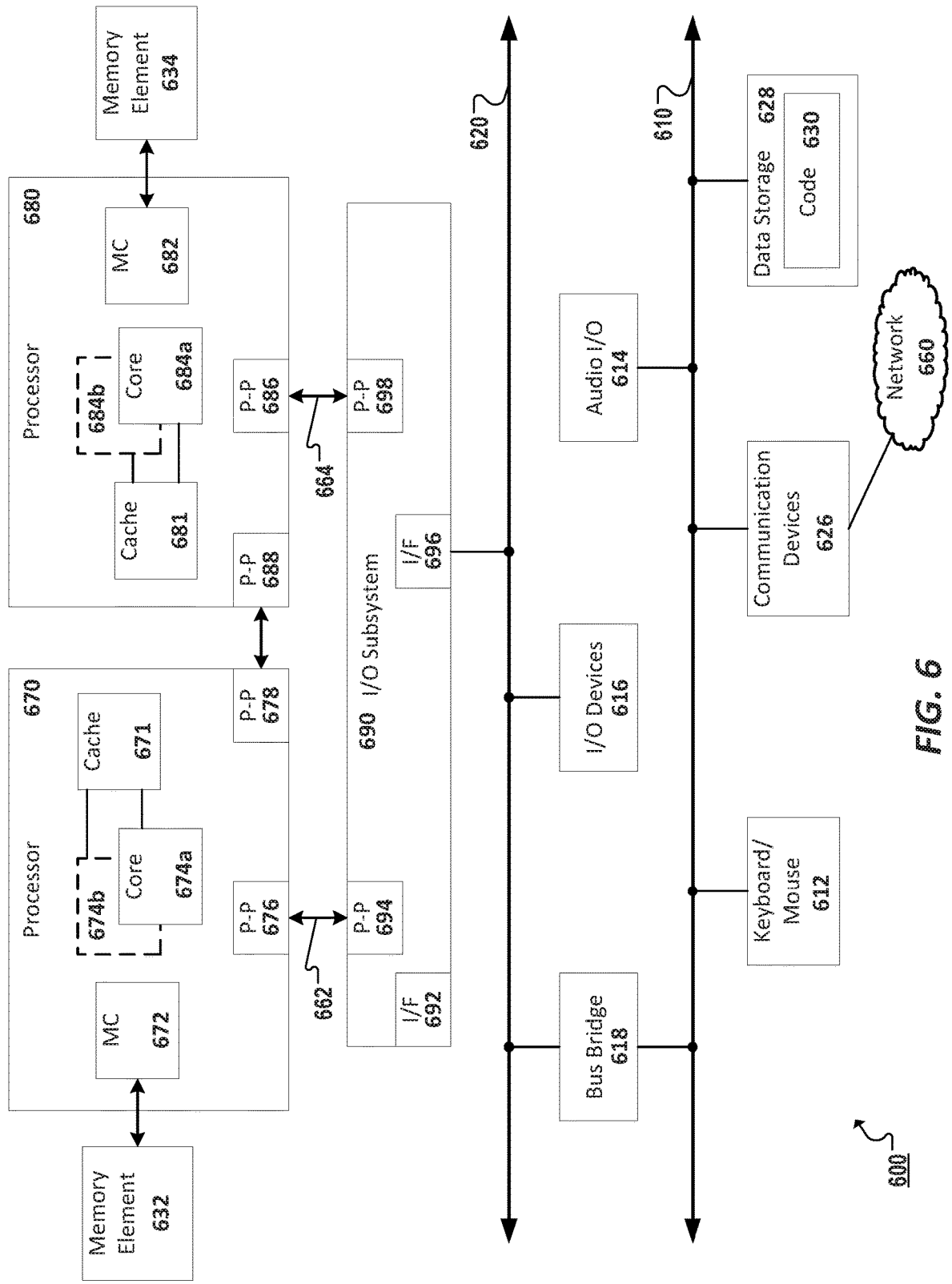
FIG. 6 is a schematic block diagram of a computing system according to an embodiment of the present disclosure.

FIGS. 4-6 are block diagrams of exemplary computer architectures that may be used in accordance with embodiments disclosed herein. Other computer architecture designs known in the art for processors, mobile devices, and computing systems may also be used. Generally, suitable computer architectures for embodiments disclosed herein can include, but are not limited to, configurations illustrated in FIGS. 4-6.

FIG. 4 is an example illustration of a processor according to an embodiment. Processor 400 is an example of a type of hardware device that can be used in connection with the implementations above.

Processor 400 may be any type of processor, such as a microprocessor, an embedded processor, a digital signal processor (DSP), a network processor, a multi-core processor, a single core processor, or other device to execute code. Although only one processor 400 is illustrated in FIG. 4, a processing element may alternatively include more than one of processor 400 illustrated in FIG. 4. Processor 400 may be a single-threaded core or, for at least one embodiment, the processor 400 may be multi-threaded in that it may include more than one hardware thread context (or "logical processor") per core.

FIG. 4 also illustrates a memory 402 coupled to processor 400 in accordance with an embodiment. Memory 402 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 400 can execute any type of instructions associated with algorithms, processes, or operations detailed herein. Generally, processor 400 can transform an element or an article (e.g., data) from one state or thing to another state or thing.

Code 404, which may be one or more instructions to be executed by processor 400, may be stored in memory 402, or may be stored in software, hardware, firmware, or any suitable combination thereof, or in any other internal or external component, device, element, or object where appropriate and based on particular needs. In one example, processor 400 can follow a program sequence of instructions indicated by code 404. Each instruction enters a front-end logic 406 and is processed by one or more decoders 408. The decoder may generate, as its output, a micro operation such as a fixed width micro operation in a predefined format, or may generate other instructions, microinstructions, or control signals that reflect the original code instruction. Front-end logic 406 also includes register renaming logic 410 and scheduling logic 412, which generally allocate resources and queue the operation corresponding to the instruction for execution.

Processor 400 can also include execution logic 414 having a set of execution units 416a, 416b, 416n, etc. Some embodiments may include a number of execution units dedicated to specific functions or sets of functions. Other embodiments may include only one execution unit or one execution unit that can perform a particular function. Execution logic 414 performs the operations specified by code instructions.

After completion of execution of the operations specified by the code instructions, back-end logic 418 can retire the instructions of code 404. In one embodiment, processor 400 allows out of order execution but requires in order retirement of instructions. Retirement logic 420 may take a variety of known forms (e.g., re-order buffers or the like). In this manner, processor 400 is transformed during execution of code 404, at least in terms of the output generated by the decoder, hardware registers and tables utilized by register renaming logic 410, and any registers (not shown) modified by execution logic 414.

Although not shown in FIG. 4, a processing element may include other elements on a chip with processor 400. For example, a processing element may include memory control logic along with processor 400. The processing element may include I/O control logic and/or may include I/O control logic integrated with memory control logic. The processing element may also include one or more caches. In some embodiments, non-volatile memory (such as flash memory or fuses) may also be included on the chip with processor 400.

Referring now to FIG. 5, a block diagram is illustrated of an example mobile device 500. Mobile device 500 is an example of a possible computing system (e.g., a host or endpoint device) of the examples and implementations described herein. In an embodiment, mobile device 500 operates as a transmitter and a receiver of wireless communications signals. Specifically, in one example, mobile device 500 may be capable of both transmitting and receiving cellular network voice and data mobile services. Mobile services include such functionality as full Internet access, downloadable and streaming video content, as well as voice telephone communications.

Mobile device 500 may correspond to a conventional wireless or cellular portable telephone, such as a handset that is capable of receiving "3G", or "third generation" cellular services. In another example, mobile device 500 may be capable of transmitting and receiving "4G" mobile services as well, or any other mobile service.

Examples of devices that can correspond to mobile device 500 include cellular telephone handsets and smartphones, such as those capable of Internet access, email, and instant messaging communications, and portable video receiving and display devices, along with the capability of supporting telephone services. It is contemplated that those skilled in the art having reference to this specification will readily comprehend the nature of modern smartphones and telephone handset devices and systems suitable for implementation of the different aspects of this disclosure as described herein. As such, the architecture of mobile device 500 illustrated in FIG. 5 is presented at a relatively high level. Nevertheless, it is contemplated that modifications and alternatives to this architecture may be made and will be apparent to the reader, such modifications and alternatives contemplated to be within the scope of this description.

In an aspect of this disclosure, mobile device 500 includes a transceiver 502, which is connected to and in communication with an antenna. Transceiver 502 may be a radio frequency transceiver. Also, wireless signals may be transmitted and received via transceiver 502. Transceiver 502 may be constructed, for example, to include analog and digital radio frequency (RF) 'front end' functionality, circuitry for converting RF signals to a baseband frequency, via an intermediate frequency (IF) if desired, analog and digital filtering, and other conventional circuitry useful for carrying out wireless communications over modern cellular frequencies, for example, those suited for 3G or 4G communications. Transceiver 502 is connected to a processor 504, which may perform the bulk of the digital signal processing of signals to be communicated and signals received, at the baseband frequency. Processor 504 can provide a graphics interface to a display element 508, for the display of text, graphics, and video to a user, as well as an input element 510 for accepting inputs from users, such as a touchpad, keypad, roller mouse, and other examples. Processor 504 may include an embodiment such as shown and described with reference to processor 400 of FIG. 4.

In an aspect of this disclosure, processor 504 may be a processor that can execute any type of instructions to achieve the functionality and operations as detailed herein. Processor 504 may also be coupled to a memory element 506 for storing information and data used in operations performed using the processor 504. Additional details of an example processor 504 and memory element 506 are subsequently described herein. In an example embodiment, mobile device 500 may be designed with a system-on-a-chip (SoC) architecture, which integrates many or all components of the mobile device into a single chip, in at least some embodiments.

FIG. 6 is a schematic block diagram of a computing system 600 according to an embodiment. In particular, FIG. 6 shows a system where processors, memory, and input/output devices are interconnected by a number of point-to-point interfaces. Generally, one or more of the computing systems described herein may be configured in the same or similar manner as computing system 600.

Processors 670 and 680 may also each include integrated memory controller logic (MC) 672 and 682 to communicate with memory elements 632 and 634. In alternative embodiments, memory controller logic 672 and 682 may be discrete logic separate from processors 670 and 680. Memory elements 632 and/or 634 may store various data to be used by processors 670 and 680 in achieving operations and functionality outlined herein.

Processors 670 and 680 may be any type of processor, such as those discussed in connection with other figures. Processors 670 and 680 may exchange data via a point-to-point (PtP) interface 650 using point-to-point interface circuits 678 and 688, respectively. Processors 670 and 680 may each exchange data with a chipset 690 via individual point-to-point interfaces 652 and 654 using point-to-point interface circuits 676, 686, 694, and 698. Chipset 690 may also exchange data with a high-performance graphics circuit 638 via a high-performance graphics interface 639, using an interface circuit 692, which could be a PtP interface circuit. In alternative embodiments, any or all of the PtP links illustrated in FIG. 6 could be implemented as a multi-drop bus rather than a PtP link.

Chipset 690 may be in communication with a bus 620 via an interface circuit 696. Bus 620 may have one or more devices that communicate over it, such as a bus bridge 618 and I/O devices 616. Via a bus 610, bus bridge 618 may be in communication with other devices such as a keyboard/mouse 612 (or other input devices such as a touch screen, trackball, etc.), communication devices 626 (such as modems, network interface devices, or other types of communication devices that may communicate through a computer network 660), audio I/O devices 614, and/or a data storage device 628. Data storage device 628 may store code 630, which may be executed by processors 670 and/or 680. In alternative embodiments, any portions of the bus architectures could be implemented with one or more PtP links.

The computer system depicted in FIG. 6 is a schematic illustration of an embodiment of a computing system that may be utilized to implement various embodiments discussed herein. It will be appreciated that various components of the system depicted in FIG. 6 may be combined in a system-on-a-chip (SoC) architecture or in any other suitable configuration capable of achieving the functionality and features of examples and implementations provided herein.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the claims.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A computer program product tangibly embodied on a non-transitory computer readable medium, the computer program product comprising executable instructions to:
   start timing an interval based on detecting client access to online content, the client access administered by a network management service;
   detect client activity associated with the online content;
   identify the client activity as a negative engagement with the online content; and
   when the negative engagement occurs within the interval:
   generate a weight associated with the negative engagement based on whether the negative engagement occurs after a positive engagement with the online content, wherein the weight is higher when the negative engagement occurs after the positive engagement than when the negative engagement that occurs without the positive engagement;
   transmit a negative engagement identifier and the weight to an analytics engine for updating a categorization of the online content in accordance with the negative engagement and the positive engagement; and
   forgo reporting the client activity to the network management service.

2. The computer program product of claim 1, wherein the computer program product further comprises executable instructions to:
   generate a first value of the weight based on detecting that the negative engagement occurs after the positive engagement.

3. The computer program product of claim 2, wherein the computer program product further comprises executable instructions to:
   generate a second value of the weight based on detecting that the negative engagement occurs without the positive engagement, wherein the first value of the weight is higher than the second value of the weight.

4. The computer program product of claim 1, wherein user activity associated with the online content that occurs during the interval is not reported to the network management service.

5. The computer program product of claim 1, wherein the negative engagement comprises the client activity terminating the client access to the online content.

6. The computer program product of claim 1, wherein the computer program product further comprises executable instructions to:
identify the client activity as the positive engagement with the online content, wherein the positive engagement comprises the client activity retrieving data associated with the online content based on a selection of an interactive component within the online content.

7. The computer program product of claim 1, wherein the computer program product further comprises executable instructions to:
generate a numeric value based on the weight, wherein the numeric value is associated with a reputation scale, wherein the weight being higher corresponds to a positive end of the reputation scale and the weight being lower corresponds to a negative end of the reputation scale.

8. The computer program product of claim 1, wherein the computer program product further comprises executable instructions to:
stop the timing after expiration of the interval, wherein the interval comprises a threshold maximum amount of time.

9. A method comprising:
timing an interval based on detecting client access to online content, the client access administered by a network management service;
detecting client activity associated with the online content;
identifying the client activity as a negative engagement with the online content; and
when the negative engagement occurs within the interval:
generating a weight associated with the negative engagement based on whether the negative engagement occurs after a positive engagement with the online content, wherein the weight is higher when the negative engagement occurs after the positive engagement than when the negative engagement that occurs without the positive engagement;
transmitting a negative engagement identifier and the weight to an analytics engine for updating a categorization of the online content in accordance with the negative engagement and the positive engagement; and
forgo reporting the client activity to the network management service.

10. The method of claim 9, further comprising:
generating a first value of the weight based on detecting that the negative engagement occurs after the positive engagement.

11. The method of claim 10, further comprising:
generating a second value of the weight based on detecting that the negative engagement occurs without the positive engagement, wherein the first value of the weight is higher than the second value of the weight.

12. The method of claim 9, wherein user activity associated with the online content that occurs during the interval is not reported to the network management service.

13. The method of claim 9, wherein the negative engagement comprises the client activity terminating the client access to the online content.

14. The method of claim 9, further comprising:
identify the client activity as the positive engagement with the online content, wherein the positive engagement comprises the client activity retrieving data associated with the online content based on a selection of an interactive component within the online content.

15. An apparatus configured to operate as an analytics engine, the apparatus comprising:
a network interface to receive an engagement indicator of online content and a weight associated with the engagement indicator from one or more network devices;
one or more processors to process the engagement indicator and the weight, the analytics engine operable to:
identify a type of the engagement indicator, the type of the engagement indicator comprising one or more of a positive engagement indicator or a negative engagement indicator, wherein the weight is higher when a negative engagement occurs after a positive engagement than when the negative engagement that occurs without the positive engagement; and
update a content characteristic of the online content based on the type of the engagement indicator and the weight, the content characteristic stored in a repository.

16. The apparatus of claim 15, wherein the weight comprises a first value generated based on the negative engagement occurring after the positive engagement.

17. The apparatus of claim 16, wherein the weight comprises a second value generated based on the negative engagement occurring without the positive engagement, wherein the first value of the weight is higher than the second value of the weight.

18. The apparatus of claim 15, wherein the engagement indicator is received during an interval in which user activity with the online content is not reported to a network management service.

19. The apparatus of claim 15, wherein the negative engagement comprises client activity terminating client access to the online content.

20. The apparatus of claim 15, wherein the analytics engine is operable to:
identify client activity as the positive engagement with the online content, wherein the positive engagement comprises the client activity retrieving data associated with the online content based on a selection of an interactive component within the online content.

* * * * *